US012797170B2

(12) United States Patent
Huang

(10) Patent No.: US 12,797,170 B2
(45) Date of Patent: Nov. 17, 2026

(54) FAUCET WITH A SPRAY GUN

(71) Applicant: Nan'an Ditao Plumbing Accessories Co., Ltd., Quanzhou (CN)

(72) Inventor: Binhui Huang, Quanzhou (CN)

(73) Assignee: Nan'an Ditao Plumbing Accessories Co., Ltd., Quanzhou (CN)

( * ) Notice: Subject to any disclaimer, the term of this patent is extended or adjusted under 35 U.S.C. 154(b) by 64 days.

(21) Appl. No.: 18/677,778

(22) Filed: May 29, 2024

(65) Prior Publication Data

US 2025/0000628 A1 Jan. 2, 2025

(30) Foreign Application Priority Data

Jun. 28, 2023 (CN) ......................... 202321662946.5
Sep. 27, 2023 (CN) ......................... 202322632640.1

(51) Int. Cl.
*A61C 17/032* (2006.01)
*E03C 1/04* (2006.01)
*E03C 1/02* (2006.01)

(52) U.S. Cl.
CPC .......... *A61C 17/032* (2019.05); *E03C 1/0404* (2013.01); *E03C 2001/026* (2013.01); *E03C 2001/0415* (2013.01)

(58) Field of Classification Search
CPC .............. A61C 17/032; A61C 17/0202; A61C 17/0217; E03C 1/0404; E03C 2001/026; E03C 2001/0415; F16K 19/006
See application file for complete search history.

(56) References Cited

U.S. PATENT DOCUMENTS 2,855,930 A * 10/1958 Blankfield ........... A61C 17/032 601/165
6,991,460 B2 * 1/2006 Karapetyan ........ A61C 17/0211 433/98
7,276,035 B2 * 10/2007 Lu ...................... A61C 17/0202 601/165
7,367,803 B2 * 5/2008 Egeresi ................ A61C 17/032 601/165
10,064,710 B2 * 9/2018 Zhang ................ A61C 17/0202
2007/0261163 A1 * 11/2007 Lynam ................. A47K 5/1202 4/654
2009/0163839 A1 * 6/2009 Alexander ........... A61C 17/032 601/165
2021/0071398 A1 * 3/2021 Liu ...................... A61C 17/032
2022/0023019 A1 * 1/2022 Wagner .................. A61C 17/02
2023/0101515 A1 * 3/2023 Yan ..................... A47L 15/0065 137/560

* cited by examiner

*Primary Examiner* — Reinaldo Sanchez-Medina

(57) ABSTRACT

A faucet with a spray gun includes a faucet housing, a main valve seat disposed on the faucet housing, a main valve core arranged within the main valve seat, and a water inlet hole on the main valve seat matching the main valve core. The faucet housing is provided with several water outlets, each having a water passage, and at least one water outlet port connected to the water passage. A water passage device is arranged between the water passage and the main valve seat. At least one water outlet port is connected to a spray gun device via a connecting pipe.

11 Claims, 14 Drawing Sheets

FAUCET WITH A SPRAY GUN

CROSS-REFERENCE TO RELATED APPLICATIONS

This application claims priority of the Chinese Application No. 202322632640.1 filed on 27 Sep. 2023, and priority of the Chinese Application No. 202321662946.5 filed 28 Jun. 2023, the entire contents of each of which are hereby incorporated reference.

TECHNICAL FIELD

The present invention relates to the field of faucet technology, and more particularly to a faucet with a spray gun.

BACKGROUND OF THE INVENTION

Faucets have become essential household items. Traditional faucets have a limited cleaning range, requiring constant movement of large objects during cleaning. These large objects are often heavy and inconvenient to move. Additionally, when rinsing deep cavities, such as the human oral cavity, the faucet cannot penetrate deeply, resulting in poor cleaning performance. Subsequent use of tools for scrubbing is often necessary, leading to insufficient convenience and functionality.

SUMMARY OF THE INVENTION

Therefore, in response to the above issues, the present invention proposes a faucet with a spray gun, offering diverse cleaning methods.

To achieve the aforementioned objectives, the present invention provides a faucet with a spray gun. The faucet includes a faucet housing, a main valve seat arranged on the faucet housing, a main valve core disposed within the main valve seat, and a water inlet hole on the main valve seat matching the main valve core. The faucet housing is provided with a plurality of water outlets, each having a water passage. Each of the water outlets has at least one water outlet port connected to the water passage. A water passage device is arranged between the water passage and the main valve seat, and a spray gun device is connected to the at least one water outlet port via a connecting pipe.

In some embodiments, the spray gun device includes a handle, a washing head provided on one end of the handle and gradually narrowing from a handle connection point to the handle, at least one washing hole on the washing head. A connecting pipe is provided on the other end of the handle. A connecting passage is located between the handle and the washing head for connecting the washing hole and the connecting pipe.

In some embodiments, the end of the washing head having the washing hole is bent outward to reduce a holding angle for users during washing.

In some embodiments, each of the water outlets is further provided with a fixed block. The fixed block is provided with a placement groove matching the end of the connecting pipe or the end of the handle.

In some embodiments, a control device is located between the water outlet port and the water passage.

In some embodiments, the control device includes a control valve seat and a control valve core. The control valve seat is provided on the water outlet, positioned between the water outlet port and the water passage. The control valve core is located within the control valve seat for controlling open and/or close of fluid flow.

In some embodiments, the connecting pipe is a retractable spring hose.

In some embodiments, the water passage device includes a water outlet hole located on the main valve seat and in communication with the main valve core. The water outlet hole is in communication with each water passage via several water pipes.

In some embodiments, the water passage device includes a sealing ring located on the main valve core for sealing with a sidewall of the main valve seat, a notch located on the water outlet hole of the main valve core for preventing the water outlet hole of the main valve core from contacting the main valve seat. The water passage runs through to be in communication with the main valve seat, and a communication point between the water passage and the main valve seat is located below the sealing ring.

In some embodiments, the water passage device includes a sealing ring located on the main valve core for sealing with a sidewall of the main valve seat, a water outlet hole located on the main valve seat and in communication with the main valve core. The at least one water passage is in communication with the water outlet hole via a water outlet pipe. The main valve core is a multi-channel switching valve core. The at least one water passage runs through to the main valve seat to be in communication with the main valve seat, and a communication point between the water passage and the main valve seat is located below the sealing ring. At least one valve core water outlet hole of the main valve core is provided on a sidewall of the main valve core, or a notch is provided on the at least one valve core water outlet hole of the main valve core for preventing the at least one valve core water outlet hole from contacting with the main valve seat.

In some embodiments, the water inlet hole includes a cold water inlet hole and a hot water inlet hole. The main valve core is a hot and cold mixing valve core.

The advantages of the present invention are as follows:

The structure of the faucet with a spray gun is simple and easy to use. The spray gun device allows the user to easily move the spray gun device to clean various parts of large objects, penetrate deep holes for direct rinsing, reduce the need for scrubbing, enhance rinsing efficiency and convenience, and improve the functionality of the faucet.

Figure 1:
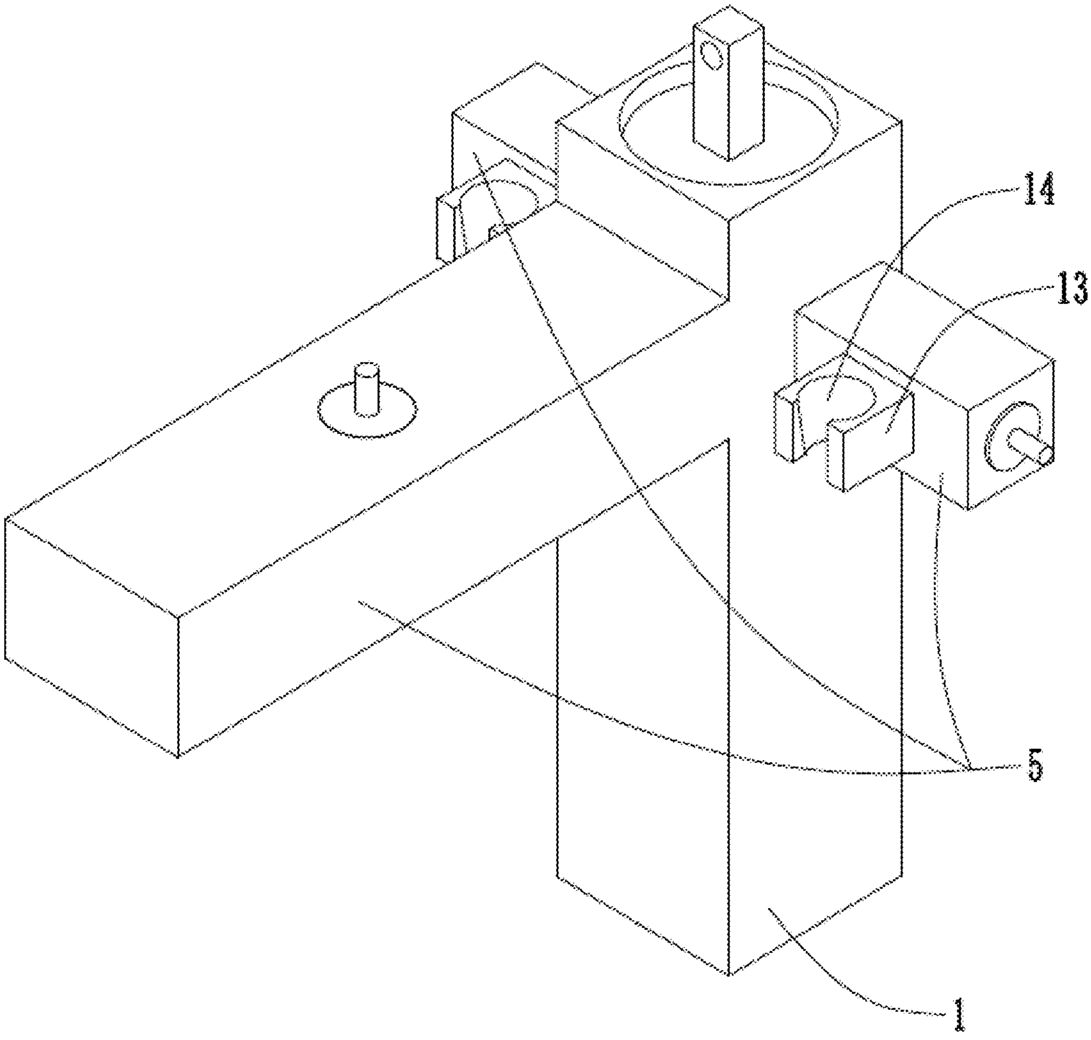
FIG. 1 is a perspective view of a faucet with a spray gun according to Embodiment 1 of the present invention.
Figure 2:
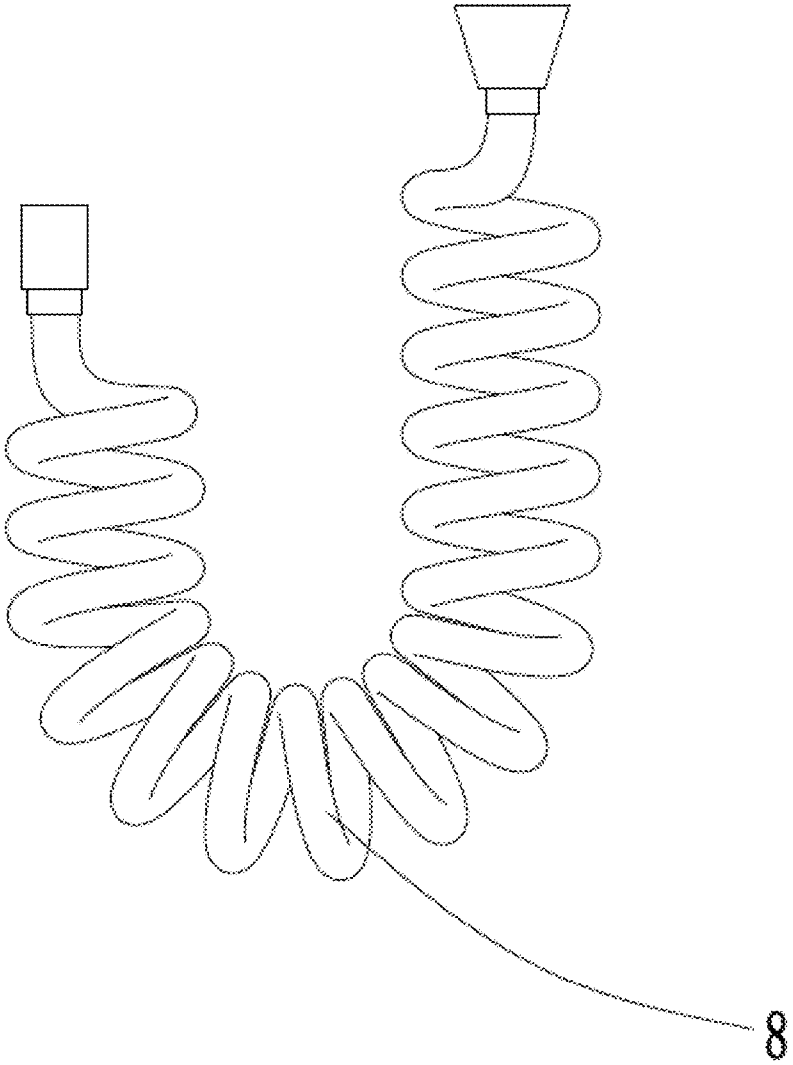
FIG. 2 is a schematic view of the connecting pipe of the faucet with a spray gun according to Embodiment 1 of the present invention.
Figure 3:
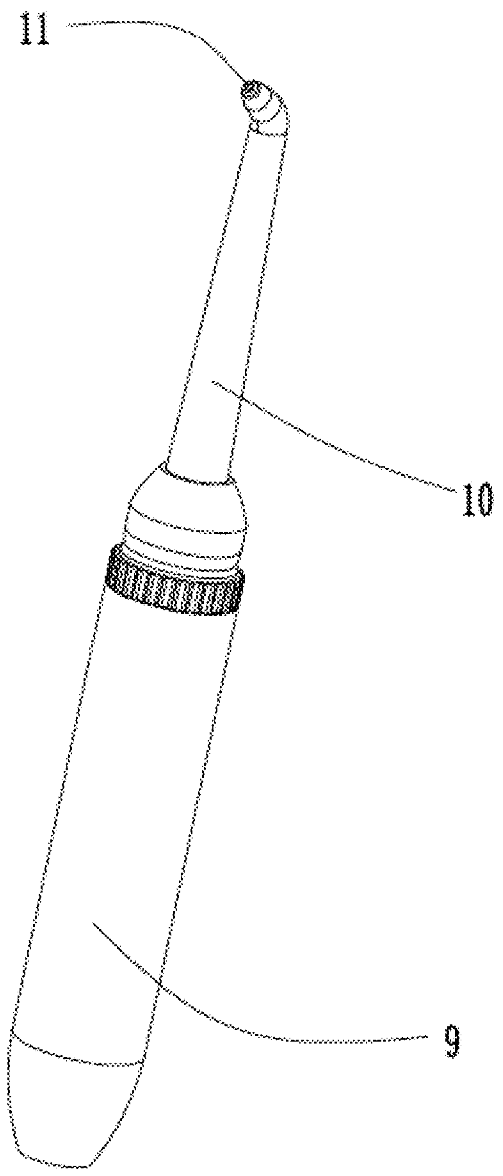
FIG. 3 is a schematic view of the spray gun device of the faucet with a spray gun according to Embodiment 1 of the present invention.
Figure 4:
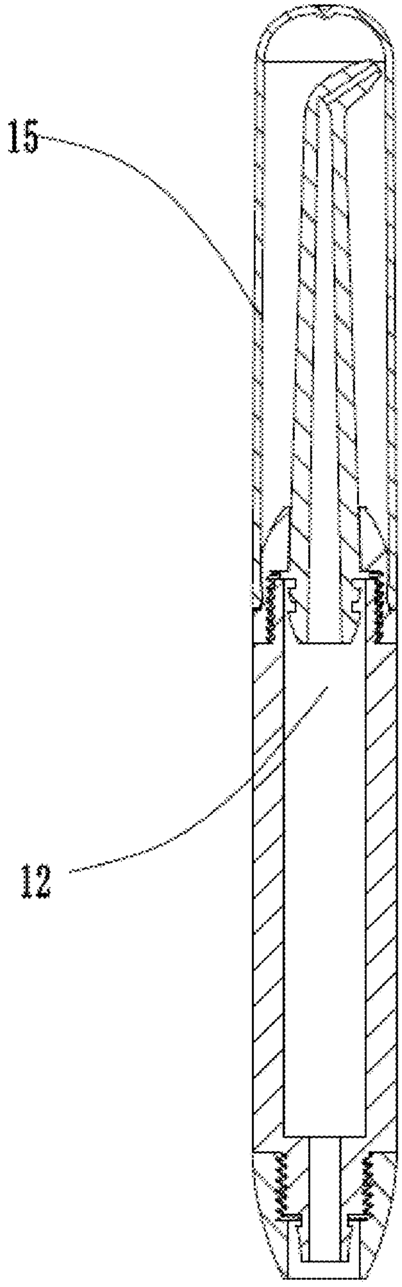
FIG. 4 is a sectional view of the spray gun device of the faucet with a spray gun according to Embodiment 1 of the present invention.
Figure 5:
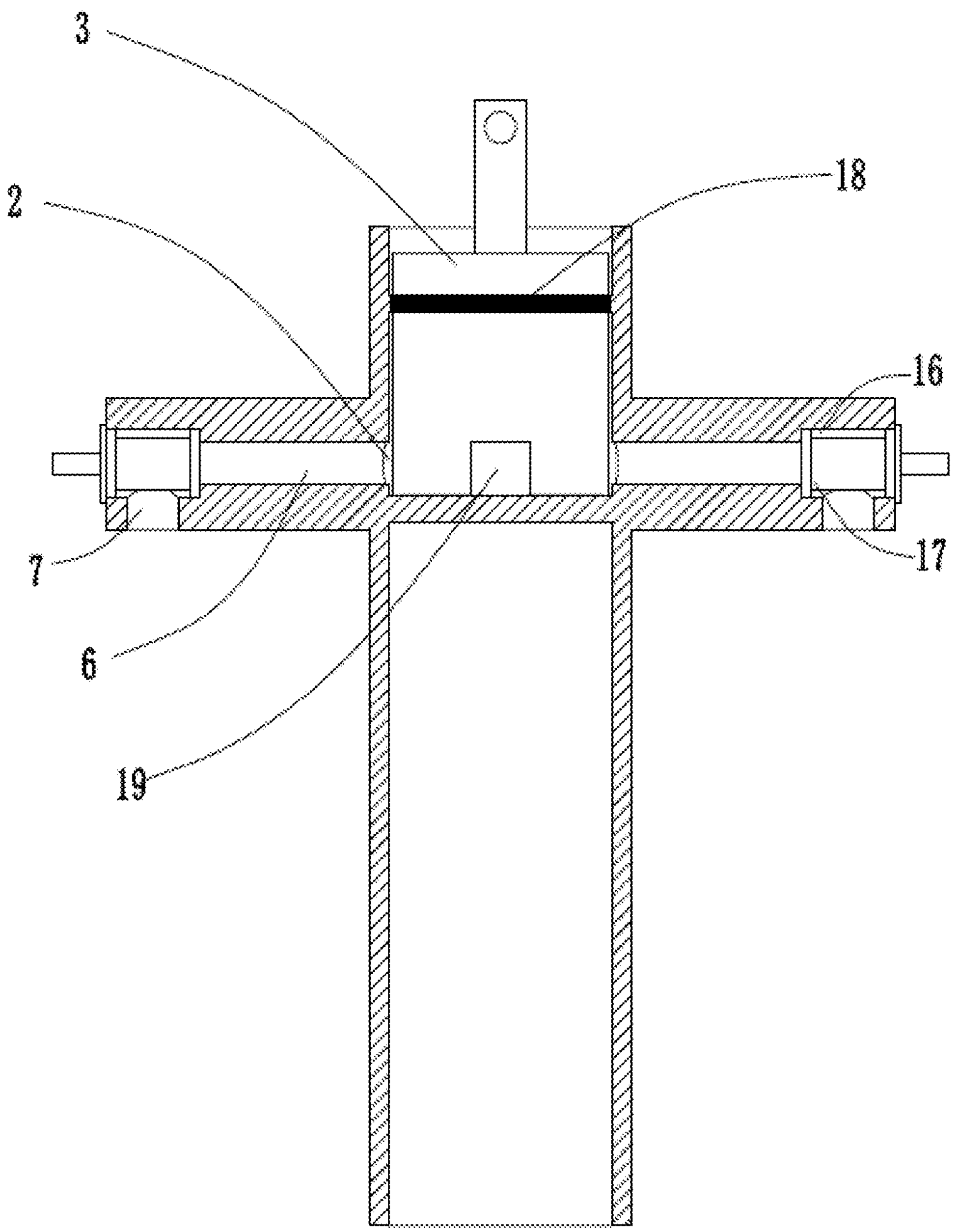
FIG. 5 is a front sectional view of the faucet with a spray gun according to Embodiment 1 of the present invention.
Figure 6:
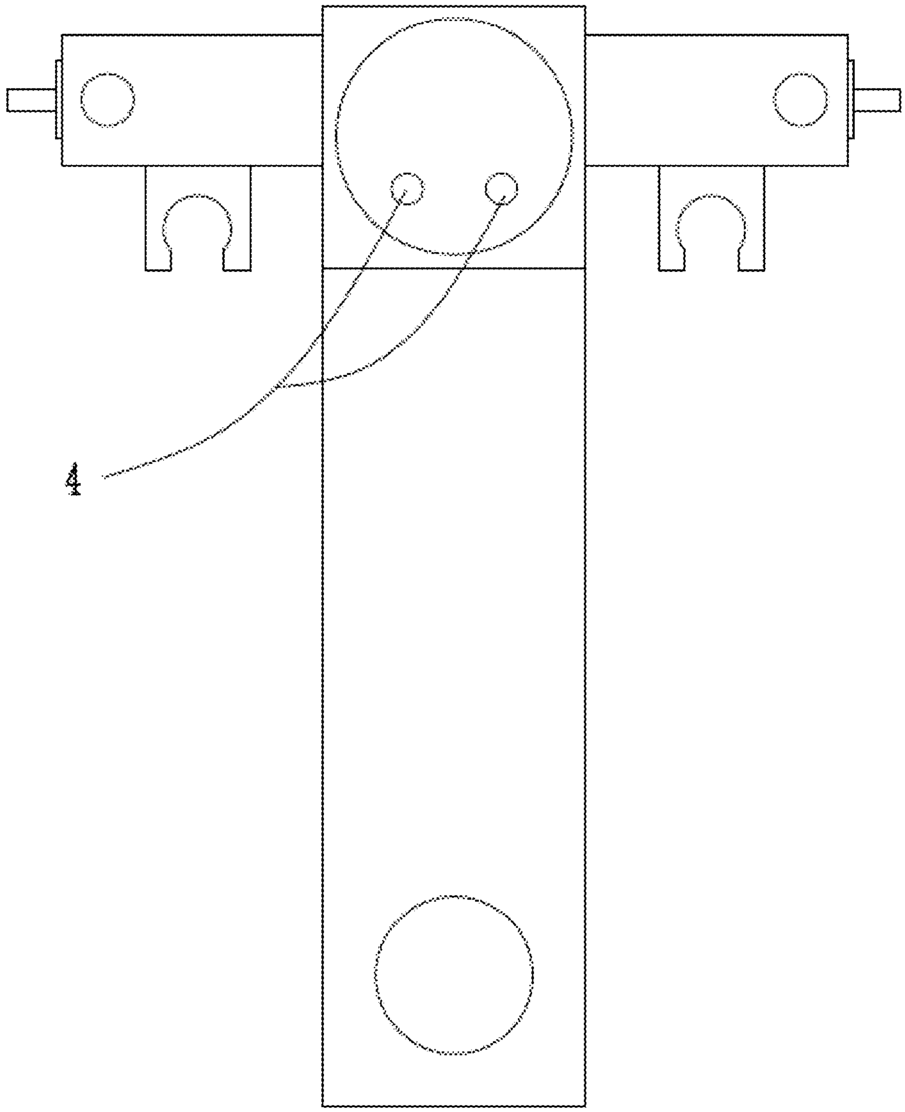
FIG. 6 is a bottom view of the faucet with a spray gun according to Embodiment 1 of the present invention.
Figure 7:
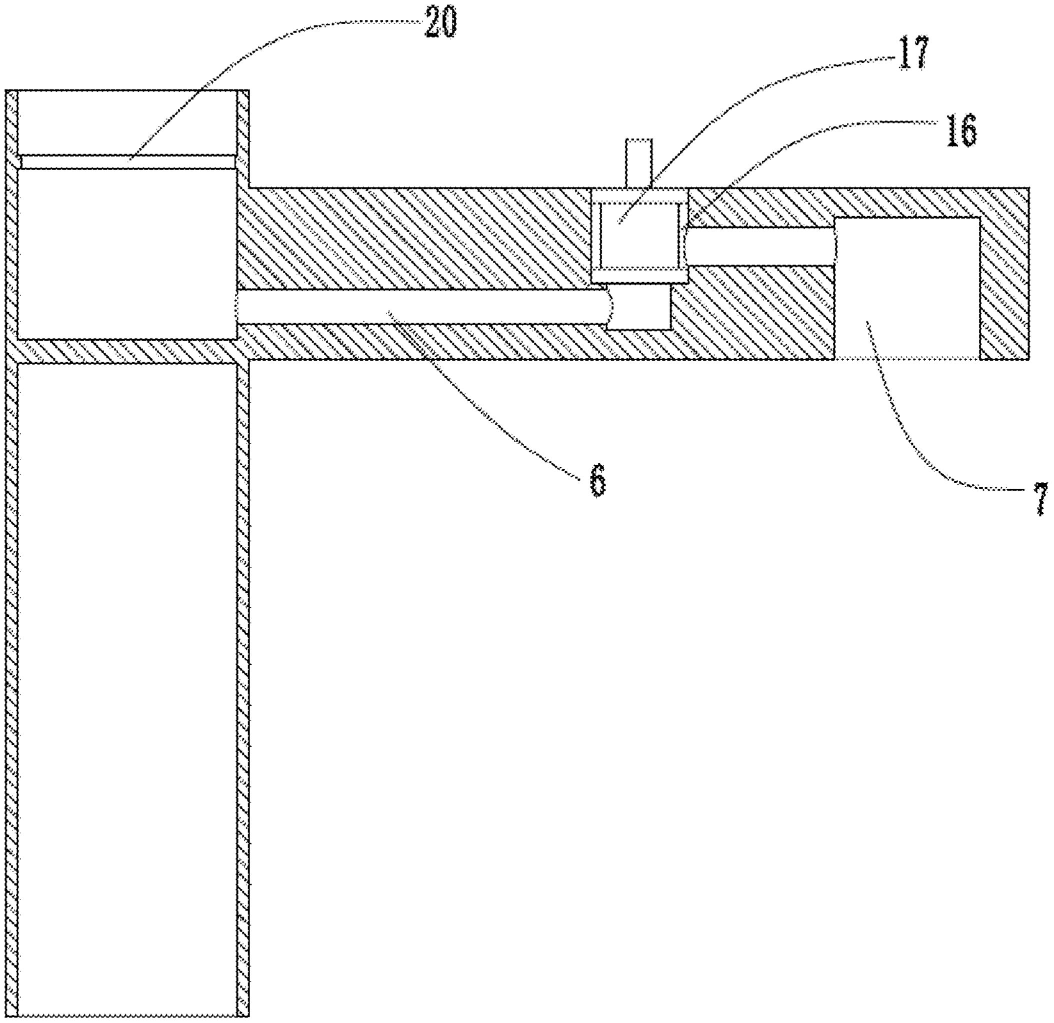
FIG. 7 is a side sectional view of the faucet with a spray gun according to Embodiment 1 of the present invention.

In the drawings: 1, faucet housing; 2, main valve seat; 3, main valve core; 4, water inlet hole; 5, water outlet; 6, water passage; 7, water outlet port; 8, connecting pipe; 9, handle; 10, washing head; 11, washing hole; 12, connecting passage; 13, fixed block; 14, placement groove; 15, protective cover; 16, control valve seat; 17, control valve core; 18, sealing ring; 19, notch; 20, smooth protrusion; 201, main valve seat; 202, water outlet hole; 203, water outlet pipe; 204, water passage; 401, main valve core; 402, main valve seat; 403, sealing ring; 404, water outlet hole; 405, water passage; 406, water outlet pipe; 407, valve core water outlet hole; 408, smooth protrusion; 501, water outlet; 502, water passage; 503, water outlet port.

DETAILED DESCRIPTION OF THE INVENTION

The specific embodiments of the present invention will be further described below in conjunction with the accompanying drawings and embodiments. The following embodiments are intended to more clearly illustrate the technical solutions of the present invention and should not be used to limit the scope of the invention.

Embodiment 1

As shown in FIGS. 1-7, a faucet with a spray gun includes a faucet housing 1, a main valve seat 2 arranged on the faucet housing 1, a main valve core 3 disposed within the main valve seat 2, and a water inlet hole 4 on the main valve seat 2 matching the main valve core 3. The faucet housing 1 is provided with several water outlets 5, each having a water passage 6. Each water outlet 5 has at least one water outlet port 7 in communication with and connected to the water passage 6. A water passage device is arranged between the water passage 6 and the main valve seat 2. A spray gun device is provided on and connected to the at least one water outlet port 7 via a connecting pipe 8.

To facilitate cleaning deep cavities and moving to clean large objects, the spray gun device includes a handle 9, a washing head 10 located on one end of the handle 9 and gradually narrowing from a connection point with the handle 9, at least one washing hole 11 located on the washing head 10. A connecting pipe 8 is located on the other end of the handle 9. A connecting passage 12 is located between the handle 9 and the washing head 10 for connecting the washing hole 11 and the connecting pipe 8.

The handle 9 and the washing head 10 may be integrally formed or assembled separately.

To facilitate the use of the spray gun device and improve holding comfort, one end of the washing head 10 with the washing hole 11 is bent outward to reduce a holding angle for users during washing.

To facilitate the placement of the spray gun device, the water outlet 5 is further provided with a fixed block 13. The fixed block has a placement groove 14 matching the end of the connecting pipe 8 or the end of the handle 9.

To extend the service life of the spray gun device, the handle 9 is further provided with a protective cover 15.

To facilitate controlling the opening and closing states of each water outlet port 7, a control device is provided between the water outlet port 7 and the water passage 6. The control device includes a control valve seat 16 on the water outlet 5 and between the water outlet port 7 and the water passage 6, and a control valve core 17 within the control valve seat 16 for controlling the open and/or close of fluid flow.

To enhance the functionality of the control device, the control valve core is a rotary valve core for controlling the fluid flow rate at the water outlet port, thereby enhancing functionality.

To extend a movable distance of the spray gun device, the connecting pipe 8 is a retractable spring hose.

To facilitate fluid flow to each water passage 6, the water passage device includes a sealing ring 18 on the main valve core 3 for sealing with a sidewall of the main valve seat 2, a notch 19 at the water outlet hole of the main valve core 3 for preventing the water outlet hole of the main valve core from contacting the main valve seat 2. The water passage 6 runs through to the main valve seat 2 to be in communication with the main valve seat 2, and a communication point between the water passage 6 and the main valve seat 2 is located below the sealing ring 18.

To enhance sealing, the sidewall of the main valve seat 2 is provided with a smooth protrusion 20 for cooperating with the sealing ring 18 to enhance scaling.

To save on the manufacturing cost of the main valve core 3, the water outlet hole of the main valve core 3 is not fitted with a sealing gasket, allowing fluid to flow directly out, thereby avoiding the need for machining the notch 19 on the main valve core 3.

To enhance the functionality of the faucet and allow it to dispense hot and cold water, the water inlet hole 4 includes a cold water inlet hole 4 and a hot water inlet hole 4, and the main valve core 3 is a hot and cold mixing valve core.

Working principle: During use, the main valve core 3 is installed in the main valve seat 2, causing the sealing ring 18 to press against the smooth protrusion 20. The water inlet pipe is then connected to the water inlet hole 4. When the main valve core 3 is opened, fluid flows out from the water outlet hole of the main valve core 3 and then to each water passage 6. By controlling each control valve core 17, the user can control the flow from each water outlet port 7. When a spray gun device and connecting pipe 8 are installed at the water outlet port 7, fluid will flow into the spray gun device and be sprayed out from the washing hole 11, allowing the user to clean objects conveniently.

Embodiment 2

Figure 8:
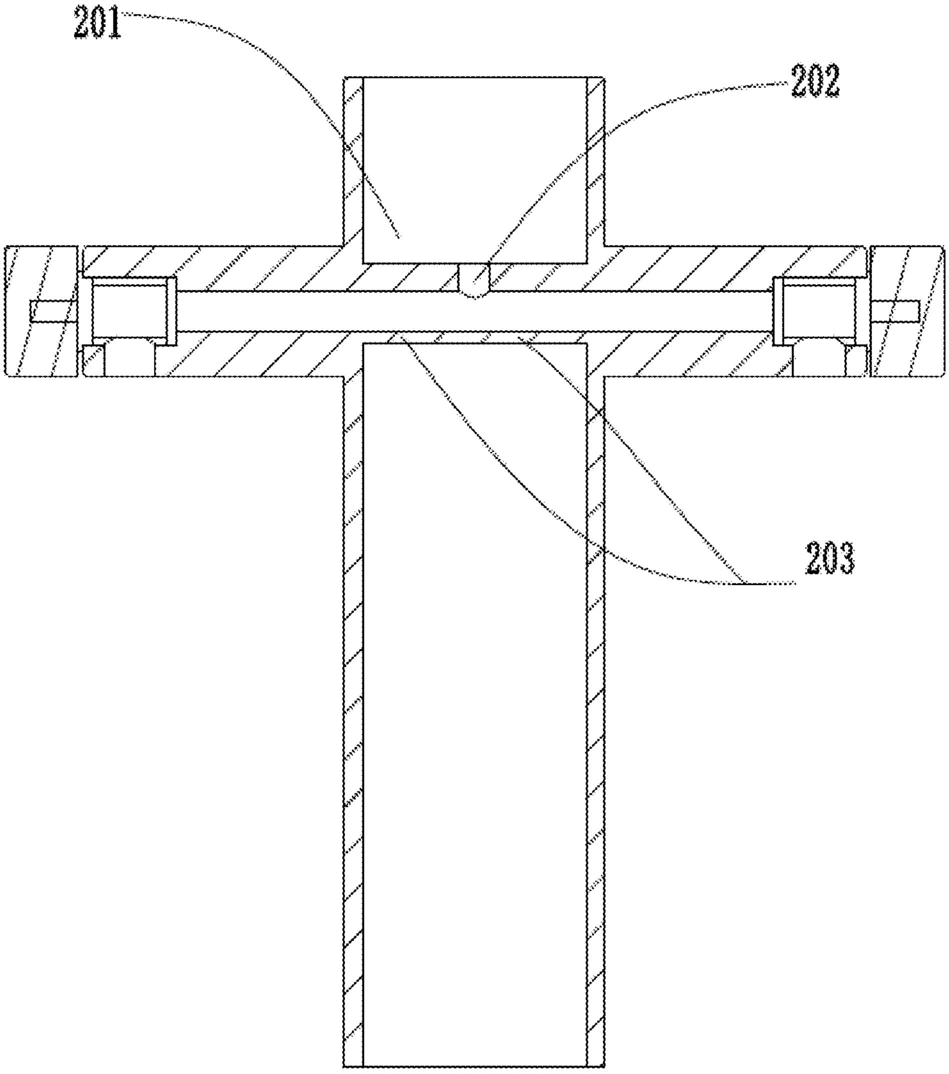
FIG. 8 is a front sectional view of the faucet with a spray gun according to Embodiment 2 of the present invention.
Figure 9:
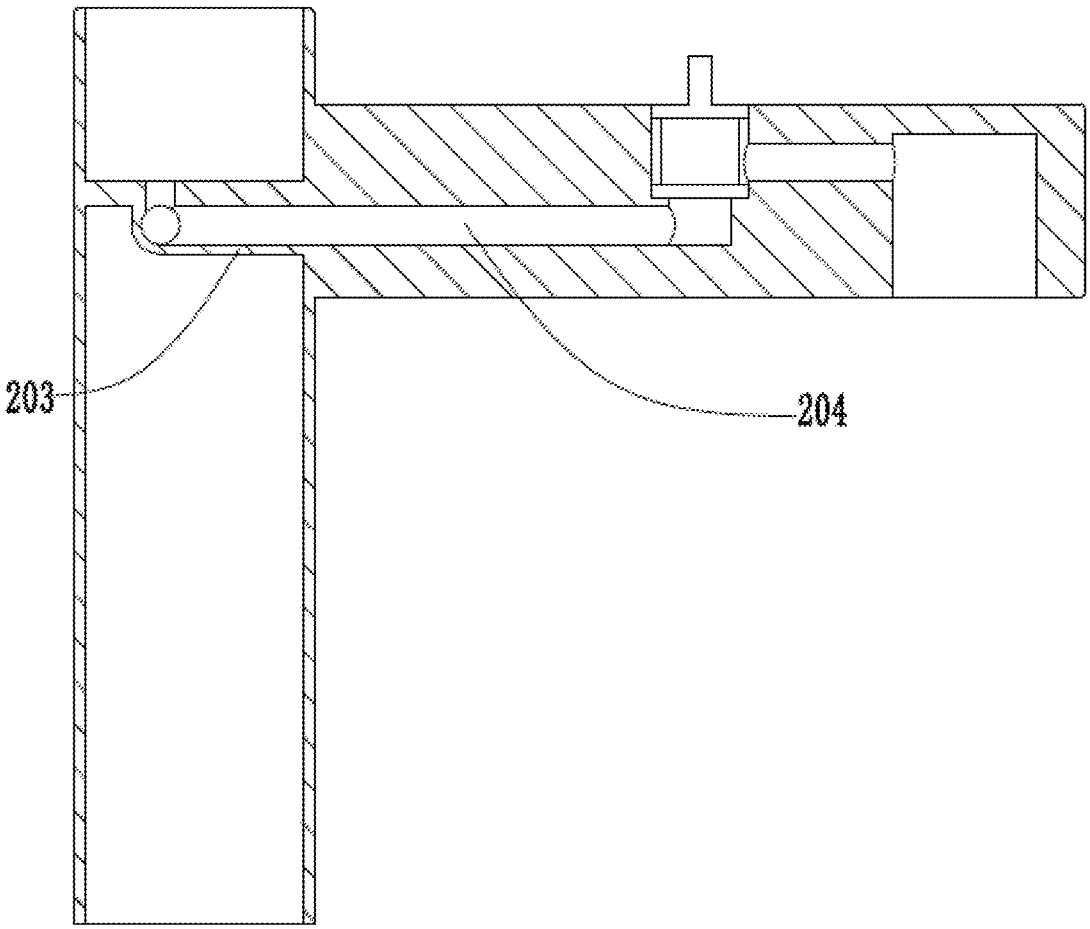
FIG. 9 is a side sectional view of the faucet with a spray gun according to Embodiment 2 of the present invention.

Based on the disclosure of Embodiment 1, as shown in FIGS. 8-9, the water passage device includes a water outlet hole 202 on the main valve seat 201, communicating with the main valve core (not shown in the figures). The water outlet hole 202 is connected to and in communication with each water passage 204 through several water pipes 203.

Embodiment 3

Figure 10:
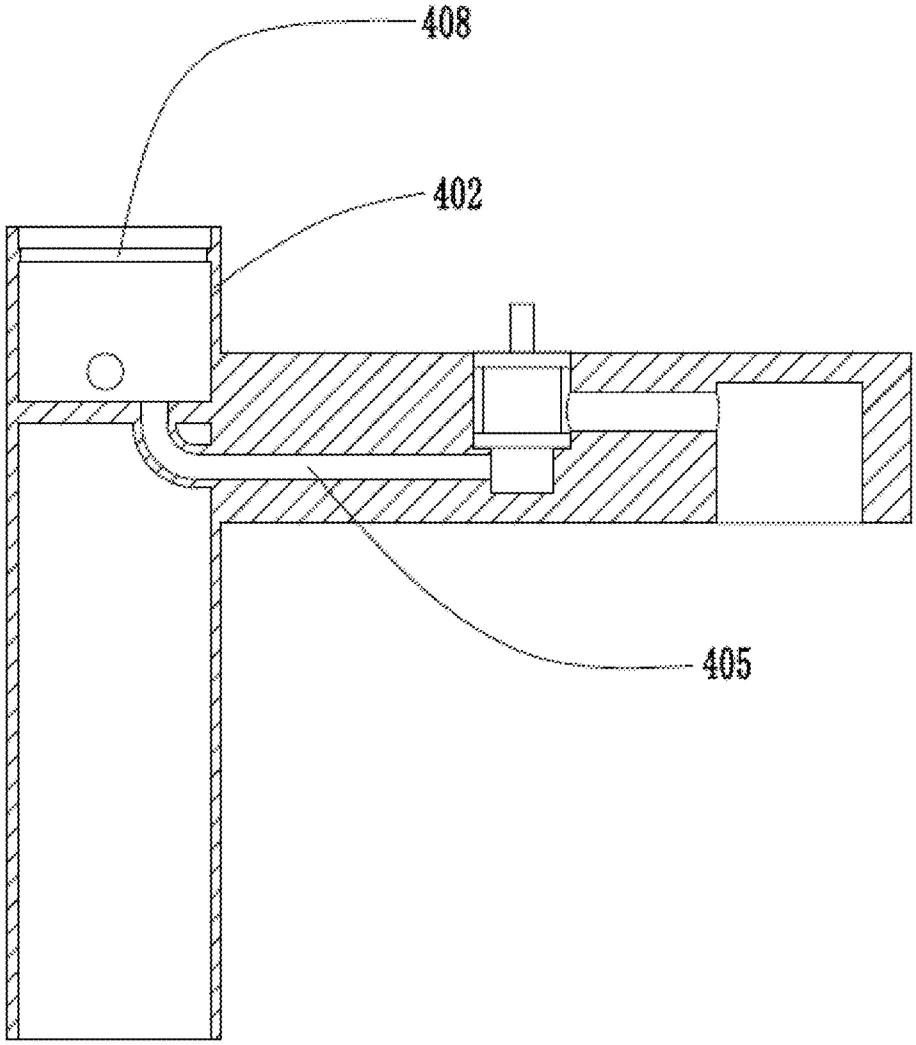
FIG. 10 is a side sectional view of the faucet with a spray gun according to Embodiment 3 of the present invention.
Figure 11:
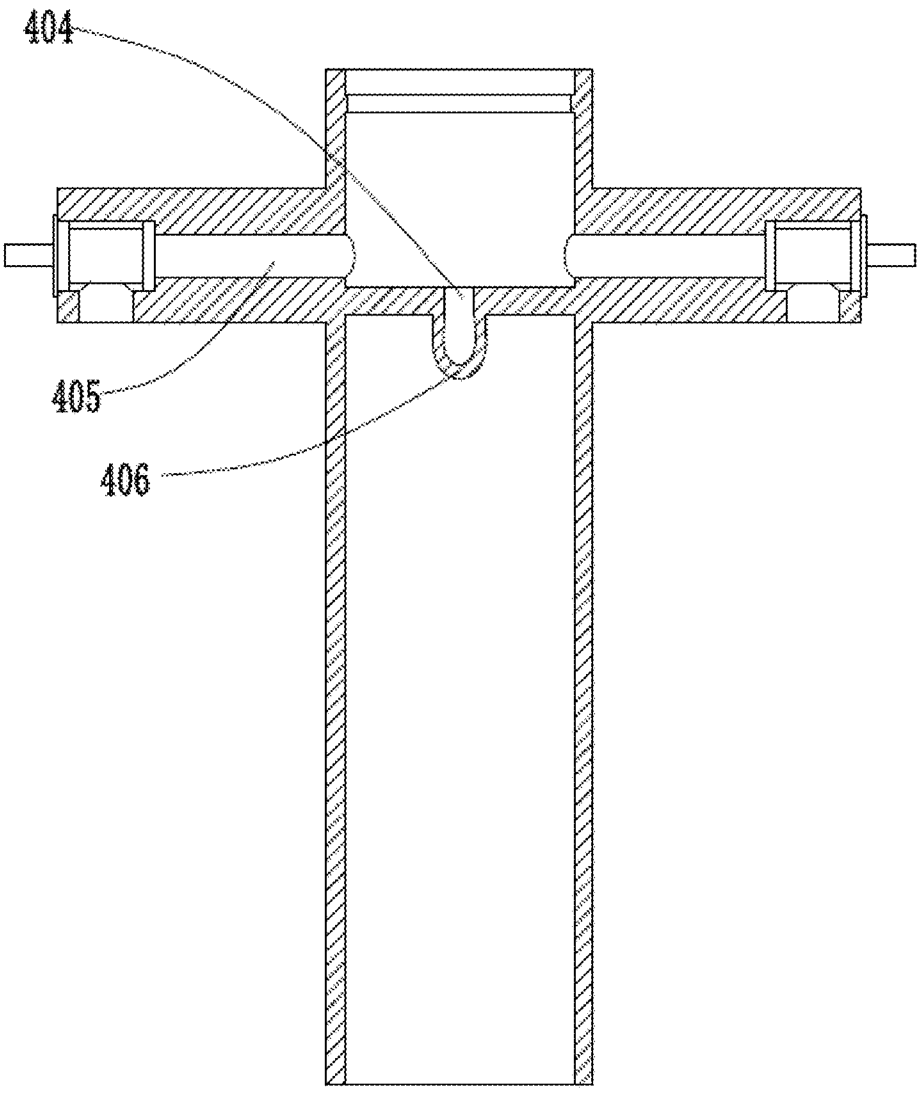
FIG. 11 is a front sectional view of the faucet with a spray gun according to Embodiment 3 of the present invention.
Figure 12:
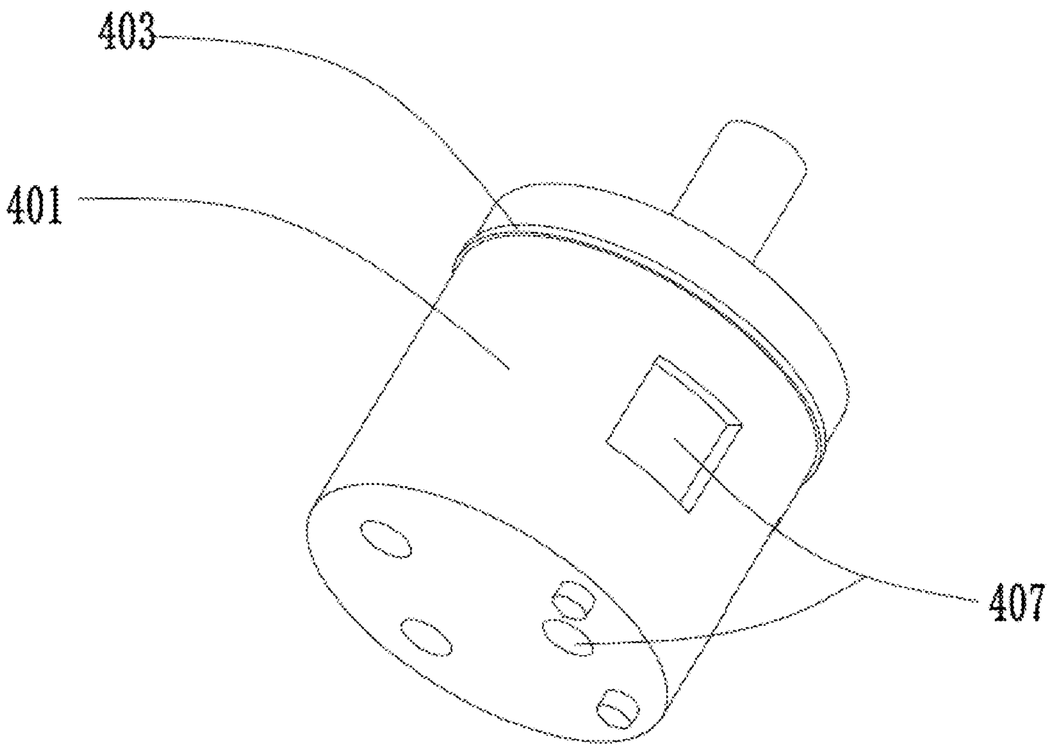
FIG. 12 is a perspective view of the main valve core of the faucet with a spray gun according to Embodiment 3 of the present invention.

Based on the disclosure of Embodiment 1, as shown in FIGS. 10-12, the water passage device includes a sealing ring 403 on the main valve core 401 for sealing with a sidewall of the main valve seat 402, and a water outlet hole 404 on the main valve seat communicating with the main valve core. At least one water passage 405 is connected to and in communication with the water outlet hole 404 through a water outlet pipe 406. The main valve core 401 is a multi-channel switching valve core. At least one water passage 405 runs through to the main valve seat and is in communication with the main valve seat. The communication point between the main valve seat and the water passage is located below the sealing ring 403. At least one valve core water outlet hole 407 of the main valve core 401 is provided on the sidewall of the main valve core, or a notch is provided on the at least one valve core water outlet hole 407 of the main valve core 401 for preventing the at least one valve core water outlet hole 407 from contacting with the valve seat.

The sidewall of the main valve seat 402 is provided with a smooth protrusion 408 for cooperating with the sealing ring 403 to enhance sealing.

Embodiment 4

Figure 13:
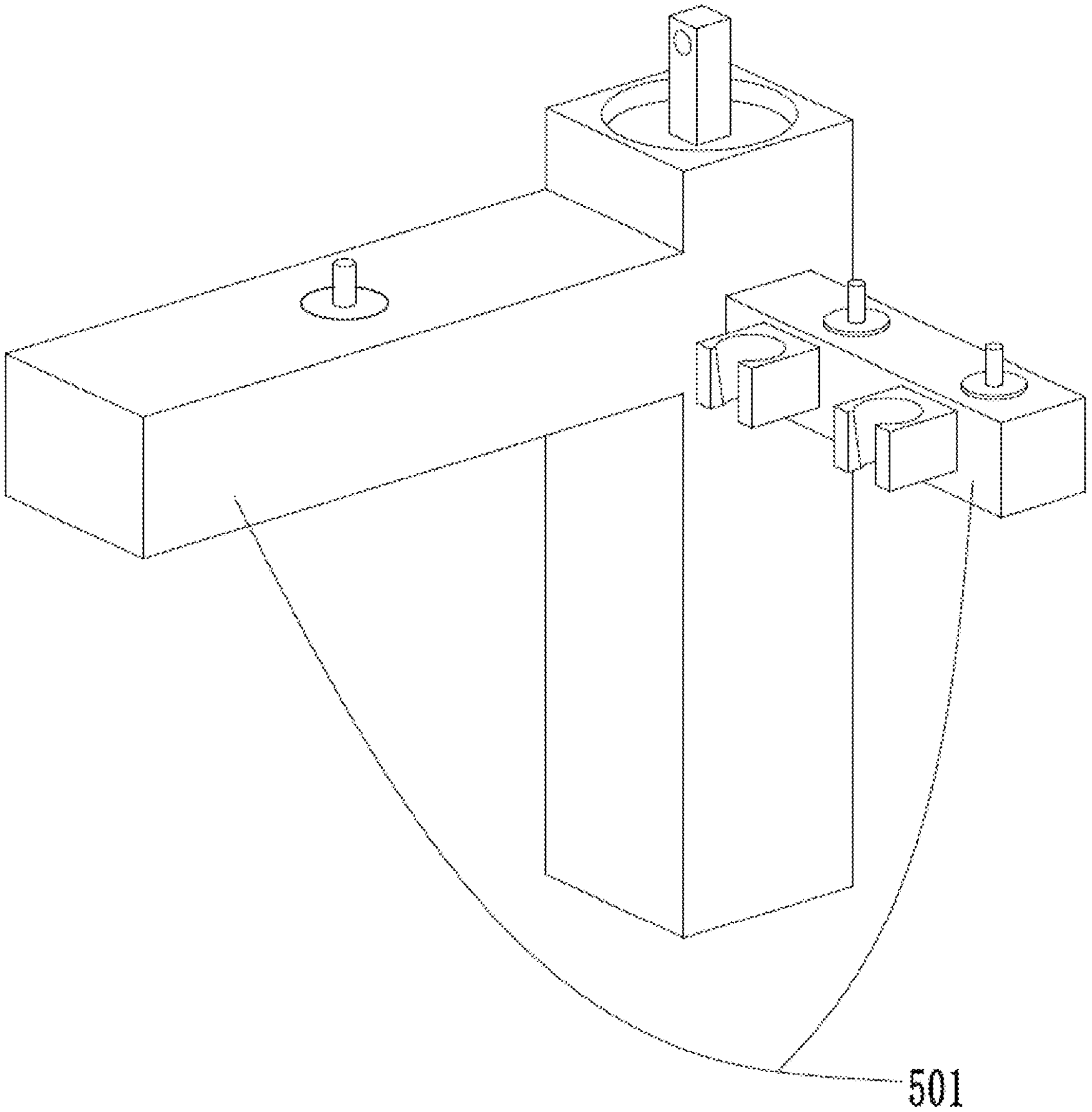
FIG. 13 is a perspective view of the faucet with a spray gun according to Embodiment 4 of the present invention.
Figure 14:
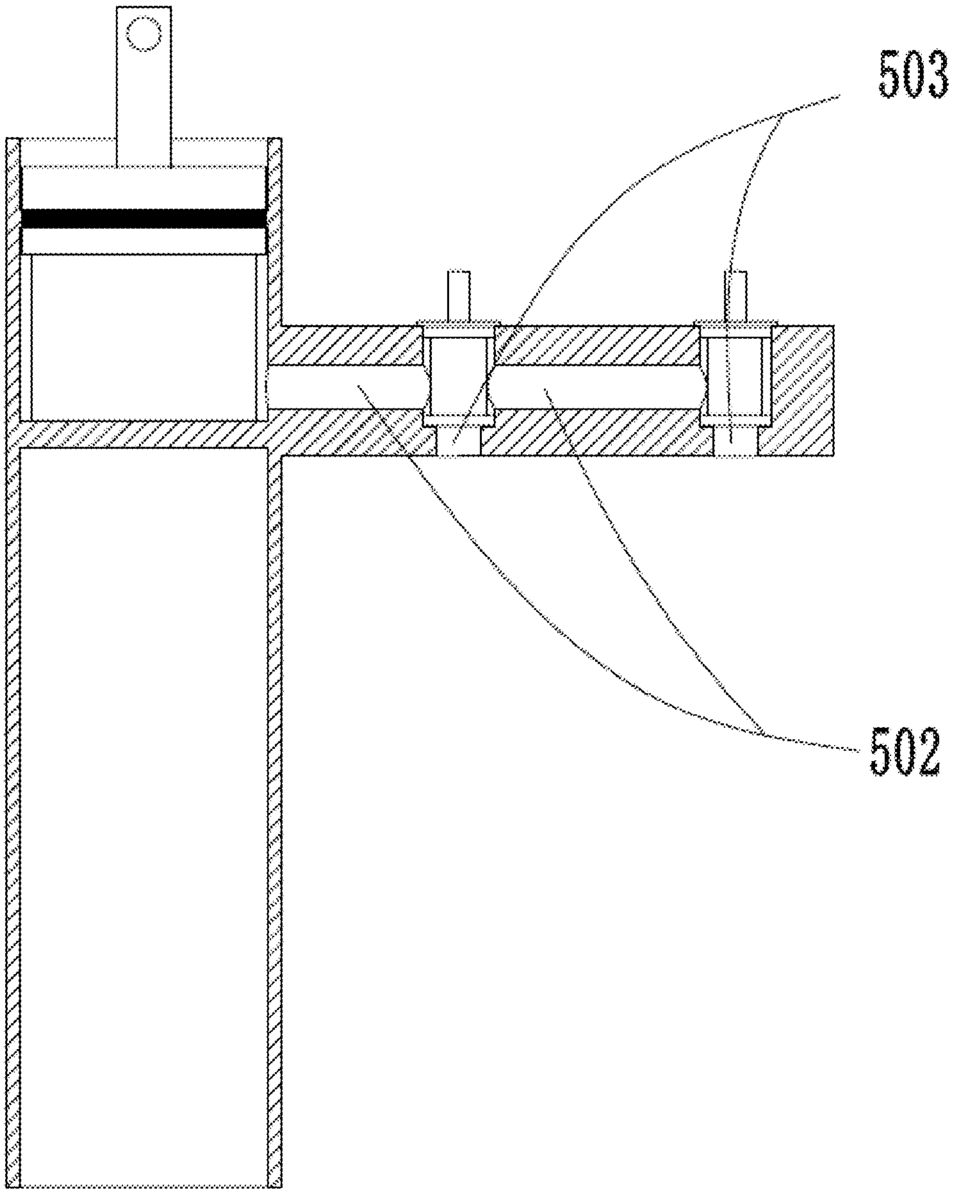
FIG. 14 is a front sectional view of the faucet with a spray gun according to Embodiment 4 of the present invention.

Based on the disclosure of Embodiment 1, as shown in FIGS. 13-14, the faucet has two water outlets 501. One of the two water outlets has a water outlet port 503 connected to and in communication with the water passage 502, while the other one of the two water outlets has two water outlet ports 503 connected to and in communication with the water passage 502. Each of the two water outlet ports 503 is provided with a spray gun device.

The above descriptions and illustrations demonstrate the basic principles, main features, and advantages of the present invention. It should be understood by those skilled in the art that the present invention is not limited to the above embodiments. The embodiments and descriptions are merely illustrative of the principles of the invention. Various modifications and improvements can be made without departing from the spirit and scope of the invention. These modifications and improvements fall within the scope of the claims and their equivalents.

What is claimed is:

1. A faucet with a spray gun, comprising a faucet housing, a main valve seat disposed on the faucet housing, a main valve core arranged within the main valve seat, and a water inlet hole on the main valve seat matching the main valve core;

wherein the faucet housing is provided with a plurality of water outlets, each of the water outlets having a corresponding water passage; each of the water outlets has at least one corresponding water outlet port connected to and in communication with the corresponding water passage;

each corresponding water passage extending to the main valve seat and communicating with the main valve seat, a communication point between the corresponding water passage and the main valve seat being located below a sealing ring disposed on the main valve core; and a spray gun device is connected to and located at one selected water outlet port among the water outlet ports via a connecting pipe.

2. The faucet with a spray gun according to claim 1, wherein the spray gun device comprises a handle, a washing head located on one end of the handle and gradually narrowing from a connection point between the washing head and the handle, at least one washing hole on the washing head; the connecting pipe is located on the other end of the handle; and a connecting passage is provided between the handle and the washing head for connecting and communicating the washing hole and the connecting pipe.

3. The faucet with a spray gun according to claim 2, wherein one end of the washing head with the washing hole is bent outward to reduce a holding angle for users during washing.

4. The faucet with a spray gun according to claim 2, wherein one of the water outlets is further provided with a fixed block; the fixed block has a placement groove matching the end of the connecting pipe or the handle.

5. The faucet with a spray gun according to claim 1, wherein a control device is provided between the corresponding water outlet port of the water outlet ports and the corresponding water passage of the water passages.

6. The faucet with a spray gun according to claim 5, wherein the control device comprises a control valve seat on the corresponding water outlet and located between the corresponding water outlet port and the corresponding water passage, and a control valve core within the control valve seat for controlling opening and/or closing of fluid flow.

7. The faucet with a spray gun according to claim 1, wherein the connecting pipe is a retractable spring hose.

8. The faucet with a spray gun according to claim 1, wherein the main valve core further comprises a notch located at a valve-core water outlet hole, the notch preventing the valve-core water outlet hole from contacting the main valve seat.

9. The faucet with a spray gun according to claim 1, wherein the faucet further comprises a water outlet hole located on the main valve seat and in communication with the main valve core; the water outlet hole is connected to and in communication with each water passage through a plurality of water pipes.

10. The faucet with a spray gun according to claim 1, wherein the main valve core is a multi-channel switching valve core; the main valve seat includes a water outlet hole in communication with the main valve core; at least one of the water passages is connected to and in communication with the water outlet hole of the main valve seat through a water outlet pipe;

and the at least one valve-core water outlet hole of the multi-channel switching valve core is located on the sidewall of the main valve core.

11. The faucet with a spray gun according to claim 1, wherein the water inlet hole comprises a cold water inlet hole and a hot water inlet hole; the main valve core is a hot and cold mixing valve core.

* * * * *